United States Patent
Chen et al.

(10) Patent No.: US 11,325,315 B2
(45) Date of Patent: May 10, 2022

(54) COMPOSITION TO PRODUCE SUPPORT SUB-STRUCTURES FOR 3D PHOTOPOLYMER JETTING

(71) Applicant: BASF SE, Ludwigshafen am Rhein (DE)

(72) Inventors: Li Chen, Shanghai (CN); Mingjie Liu, Beijing (CN); Yongai Yin, Beijing (CN); Ziguang Zhao, Beijing (CN)

(73) Assignee: BASF SE, Ludwigshafen am Rhein (DE)

(*) Notice: Subject to any disclaimer, the term of this patent is extended or adjusted under 35 U.S.C. 154(b) by 0 days.

(21) Appl. No.: 16/958,940

(22) PCT Filed: Dec. 19, 2018

(86) PCT No.: PCT/EP2018/085770
§ 371 (c)(1),
(2) Date: Jun. 29, 2020

(87) PCT Pub. No.: WO2019/129560
PCT Pub. Date: Jul. 4, 2019

(65) Prior Publication Data
US 2020/0338833 A1    Oct. 29, 2020

(30) Foreign Application Priority Data
Dec. 29, 2017 (CN) .............. PCT/CN2017/119912

(51) Int. Cl.
| | |
|---|---|
| *C08F 2/46* | (2006.01) |
| *C08F 2/50* | (2006.01) |
| *C08G 61/04* | (2006.01) |
| *B29C 64/40* | (2017.01) |
| *B29C 64/112* | (2017.01) |
| *C08F 220/60* | (2006.01) |
| *C08F 2/14* | (2006.01) |
| *C08F 220/06* | (2006.01) |
| *C08F 220/18* | (2006.01) |
| *C08K 5/12* | (2006.01) |
| *B33Y 10/00* | (2015.01) |
| *B33Y 30/00* | (2015.01) |
| *B33Y 70/00* | (2020.01) |

(52) U.S. Cl.
CPC .......... *B29C 64/40* (2017.08); *B29C 64/112* (2017.08); *C08F 2/14* (2013.01); *C08F 2/50* (2013.01); *C08F 220/06* (2013.01); *C08F 220/18* (2013.01); *C08F 220/603* (2020.02); *C08K 5/12* (2013.01); *B33Y 10/00* (2014.12); *B33Y 30/00* (2014.12); *B33Y 70/00* (2014.12)

(58) Field of Classification Search
CPC ....... B29C 64/112; B29C 64/40; C09D 11/38; C09D 11/101; B33Y 70/00; B33Y 10/00; B33Y 30/00; C08K 5/12; C08F 2/50; C08F 2/14; C08F 220/06; C08F 220/18; C08F 220/603
USPC .... 522/37, 36, 33, 6, 189, 184, 71, 1; 520/1
See application file for complete search history.

(56) References Cited

U.S. PATENT DOCUMENTS

| | | | |
|---|---|---|---|
| 9,556,346 B2 | 1/2017 | Suzuki et al. | |
| 10,232,529 B2 | 3/2019 | Xu et al. | |
| 10,335,994 B2 | 7/2019 | Napadensky et al. | |
| 2004/0187714 A1 | 9/2004 | Napadensky et al. | |
| 2016/0340529 A1* | 11/2016 | Lawrence | C09D 11/104 |
| 2018/0036954 A1 | 2/2018 | Fleischhaker et al. | |

FOREIGN PATENT DOCUMENTS

| | | | |
|---|---|---|---|
| CN | 1926470 A | 3/2007 | |
| CN | 103189187 A | 7/2013 | |
| CN | 103476570 A | 12/2013 | |
| EP | 1741545 A2 | 1/2007 | |
| EP | 3251818 A1 | 12/2017 | |
| WO | WO-2016139287 A1 | 9/2016 | |
| WO | WO-2018143299 A1 * | 8/2018 | ............. B33Y 70/00 |

OTHER PUBLICATIONS

Kito et al, WO 2018143299 Machine Translation, Aug. 9, 2018 (Year: 2018).*
International Search Report for PCT/EP2018/085770 dated Mar. 15, 2019.
Written Opinion of the International Searching Authority for PCT/EP2018/085770 dated Mar. 15, 2019.
Dai, et al., "A Mechanically Strong, Highly Stable, Thermoplastic, and Self-Healable Supramolecular Polymer Hydrogel", Advanced Materials, vol. 27, Issue 23, May 6, 2015, pp. 3566-3571.
Haas, et al., "Thermally reversible homopolymer gel systems", Journal of Polymer Science Part B: Polymer Letters, vol. 2, Issue 12, Dec. 1964, pp. 1095-1096.

* cited by examiner

*Primary Examiner* — Jessica Whiteley
(74) *Attorney, Agent, or Firm* — Faegre Drinker Biddle & Reath LLP

(57) ABSTRACT

The present invention is directed to a UV-curable composition capable of producing a 3D-printed support sub-structure for photopolymer jetting, and to a 3D-printing processes using said support material composition, and to a 3D-printed articles obtainable with said 3D-printing processes. The composition comprises a N-acryloyl glycinamide type monomer, anoptional hydrophilic co-monomer, a hydrophilic dispersion medium or water, a photoinitiator, and an optional functional additive or combination thereof, at specific contents.

20 Claims, No Drawings

COMPOSITION TO PRODUCE SUPPORT SUB-STRUCTURES FOR 3D PHOTOPOLYMER JETTING

CROSS-REFERENCE TO RELATED APPLICATIONS

This application is a national stage application (under 35 U.S.C. § 371) of PCT/EP2018/085770, filed Dec. 19, 2018, which claims benefit of Chinese Application No. PCT/CN2017/119912, filed Dec. 29, 2017, both of which are incorporated herein by reference in their entirety.

BACKGROUND

The present invention is directed to a UV-curable composition capable of producing a 3D-printed support sub-structure for photopolymer jetting, and to a 3D-printing processes using said support material composition, and to a 3D-printed articles obtainable with said 3D-printing processes.

Photopolymer jetting is a widely used 3D-printing technology, in which drops of a liquid photopolymer as a build material are jetted onto a build platform through the nozzles of inkjet print heads, and then immediately polymerized and cured by UV light to form a layer of pattern of the build material. This process is repeated layer by layer to build a 3D model.

A UV-curable support material is used in the photopolymer jetting process to facilitate successful printing of complicated geometries such as fine structures, overhangs and hollow structures. Drops of the support material and build material are jetted onto the build platform to form a layer of pattern of the build material and the support material in such a way that, when the printing process is repeated layer by layer, the two materials form a composite structure with two sub-structures. The printed build material and the support material are then immediately cured by UV light, forming a composite structure with a 3D-printed support sub-structure formed by the support material and a 3D-printed build sub-structure formed by the build material, wherein the 3D-printed support sub-structure supports the 3D-printed build sub-structure. After the completion of the process, the 3D-printed support sub-structure is removed, leaving the 3D-printed article made of the 3D-printed build sub-structure as the final product.

The removal of the 3D-printed support sub-structure is normally done by chemical washing process using, for example, aqueous caustic soda solution, or by a high-pressure water-jet station after the printing work is completed. There are several disadvantages for such a removal process: 1) dedicated cleaning and plumbing apparatus are required; 2) labor intensive process for multiple parts is involved; 3) incomplete removal of the support material may occur, especially within the cavities of the 3D-printed build sub-structure; 4) poor surface quality or loss of details may be obtained due to mechanical and/or chemical washing. To overcome the problems above, it is highly desired to have a UV-curable support material which is completely water-soluble so that it can be removed by a fast, easy and chemical-free removing process.

CN103476570A disclosed the use of support materials for 3D-printing. A water-dispersible 3D-printing support material comprising a wax component which comprises an ethoxylated fatty alcohol and a viscosity modifier is 3D-printed in combination with a 3D-printing build material to form a 3D-printed composite structure. The support material is a liquid in the printer head at elevated temperature and is frozen into a solid once it is deposited onto the surface of the structure being printed. The solidified support material is later removed with water to obtain the finished product made of the build material. The solidification of the support material after printing and the removal of the solid support material are based on melting point and water dispersity. The application did not disclose how to fine-tune the solidification and water dissolution behavior of the support material.

CN03189187A disclosed the production of a 3D-printed article from a modeling material and a supporting material via photo-fabrication followed by water washing to remove the supporting material. The modeling material is selected according to its weighted average SP value. The supporting material comprises a water-soluble mono-functional ethylenically unsaturated monomer such as a (meth)acrylate, an oxypropylene group containing alkylene oxide and a photoinitiator. The modeling material and the supporting material are 3D-printed and photo-cured to form a composite structure. The cured supporting material is then removed by water washing. As there is no crosslinking mechanism for the supporting material, the cured supporting material appears to be weak and needs to be strengthened by oxypropylene group containing alkylene oxide. However, it will be difficult to balance the strength and the removability of the supporting material, as there is only one parameter to work with, particularly when a stronger supporting material is needed.

CN1926470A used a first interface material as build material and a second interface material as support material in 3D-printing. The second interface material can be a non-curable liquid, or a curable liquid leading to a weak solid that can swell and break up when it contacts water, so that the second interface material can be easily removed with minimal manual work. The second interface material can be a combination of a non-curable component and a curable component, both are water soluble.

Although the concept of 3D-printing support material and 3D-printed support sub-structure does exist, currently available 3D-printing support material is difficult to remove and/or doesn't offer desirable surface quality for the 3D-printed build sub-structure left after the removal of the 3D-printed support sub-structure. Furthermore, it is difficult to adjust the properties of the 3D-printing support material by changing the composition forming it.

It is therefore an objective of the present invention to provide an alternative 3D-printing support material for photopolymer jetting, which offers strong yet easy-to-remove 3D-printed support sub-structure and ease of adjustment of properties thereof.

DISCLOSURE OF THE INVENTION

The present invention uses a UV-curable 3D-printing support material composition to form a 3D-printed support sub-structure which is capable of supporting overhang structures during photopolymer jetting process and is water-soluble at temperature up to 90° C., preferably about 50° C. so that the support material can be removed easily in warm water.

In a preferred embodiment of the present invention, the inventive composition comprises:
(a) at least one N-acryloyl glycinamide (NAGA hereafter) type monomer at the content of 5%~30% by weight, preferably 10%~25% by weight, more preferably 15%~25% by weight, said monomer is of the structure

wherein X is $-(CH_2)_{x1}-$, x1 is an integer of 1 to 10, preferably 1 to 6, more preferably 1 to 4, or $-(CH_2CH_2O)_{x2}-$, x2 is an integer of 1 to 5, preferably 1 to 2; $R_1$ is H or $CH_3$, $R_2$ and $R_3$ are each independently H or $-C_mH_{2m+1}$, m is an integer of 1 to 4, $R_2$ and $R_3$ are preferably independently selected from the group consisting of H, methyl group, ethyl group and propyl group, and more preferably at least one of $R_2$ and $R_3$ being H;
(b) optionally at least one mono-functional hydrophilic, preferably water soluble, more preferably water-miscible co-monomer, at the content of 1.5%~13.5% by weight, preferably 5%~10% by weight, if any;
(c) at least one hydrophilic, preferably water soluble, more preferably water-miscible dispersion medium or water;
(d) at least one photoinitiator at the content of 0.1%~10% by weight; preferably 0.5%~5% by weight.

All the weight percentages are based on the total weight of the composition.

Component (a), NAGA type monomer, is a monomeric compound whose polymer can form a dual-hydrogen bonded gel material (Haas, H. C. et al., J. Polym. Sci. Part B, 2, 1095-1096 (1964); Dai, X. et al. Adv. Mater. 27, 3566-3671 (2015)). The polymer chains formed by the component (a) are crosslinked via hydrogen bonds rather than covenant bonds as in conventional gel materials. When being heated up, the NAGA gel material can undergo gel-to-sol transition to liquid state due to weakening of the hydrogen bonding. The NAGA type monomer can be prepared, for example, via the method as disclosed in Support Information of Dai, X. et al. Adv. Mater. 27, 3566-3671 (2015).

Component (b) can be any co-monomer that is capable of copolymerizing with component (a) under UV light, preferably via C=C double bond, under the initiation action of component (d). The component (b) is hydrophilic, preferably water soluble, more preferably water-miscible. Component (b) is preferably (meth)acrylic monomers. The term "mono-functional" in this context means it has only one co-polymerizable double bond in the chemical formula, preferably the co-polymerizable double bond is C=C double bond. Examples of (b) include acryloyl morpholine (ACMO); 4-Hydroxybutyl acrylate (4-HBA), (meth)acrylic acid, 2-hydroxylethyl (meth)acrylate, hydroxypropyl (meth) acrylate, N,N-dimethylaminoethyl (meth)acrylate, N-vinyl-formamide, (meth)acrylamide, N-hydroxyethyl (meth)acrylamide, sodium (meth)acrylate. These monomers are commercially available from chemical companies such as Sigma-Aldrich, St. Louis, Mo., USA.

Component (c) is a dispersion medium in the copolymerization of (a) and (b). When the network is in contact with warm water, component (c) also helps breaking the network down into small pieces to facilitate dissolution of the network. Examples of (c) include ethylene glycol, polyethylene glycol, propylene glycol, polypropylene glycol and glycerol, all of which are widely available commercially and can be purchased from chemical companies such as Sigma-Aldrich, St. Louis, Mo., USA, and water.

Component (d) can be any photoinitiator that can initiate the copolymerization of (a) and (b) (if any) under UV light. Such initiators can be, for example, Darocur BP, Darocur 1173, Darocur 4265, Irgacure 184, Irgacure 250, Irgacure 369, Irgacure 379, Irgacure 651, Irgacure 754, Irgacure 819, Irgacure 2022, Irgacure 2100, Irgacure 2959, Irgacure TPO, Irgacure TPO-L, all available commercially from BASF SE, Ludwigshafen, Germany. However, it should be appreciated that it is possible to use other types of initiators in principle, as long as it can initiate the copolymerization of (a) and (b) (if any) successfully and does not have negative impact on the properties of the polymer network produced.

Successful implementation of the present invention relies on proper balancing of i) the copolymerization rate of the 3D-printing support material composition of the present invention upon initiation; ii) the mechanical strength of the 3D-printed support sub-structure formed after polymerization of the 3D-printing support material composition; and iii) the solubility and dissolution rate of the 3D-printed support sub-structure in warm water. These can be achieved by optimization of the structure of components (a), (b) (if any), (c) and (d), and their respective concentrations in the formula that is used in forming the support material.

The requirement on i) the copolymerization rate of the 3D-printing support material composition, ii) the mechanical strength of the 3D-printed support sub-structure and iii) the solubility and dissolution rate of the 3D-printed support sub-structure, are apparently dictated by the printing process and polymerization process, and can be determined by those skilled in the art.

Higher copolymerization rate of the 3D-printing support material composition enables higher productivity. The copolymerization rate is set in such a way that the full conversion of liquid material on the surface of build platform into solid state is completed within, for example, 0.1 to 2 seconds, preferably 1 second.

Suitable mechanical strength of the 3D-printed support sub-structure must be good enough so that structural integrity of the 3D-printed support sub-structure is maintained during the printing of the 3D-printing build material, yet weak enough so that there is no difficulty in the subsequent removal of the 3D-printed support sub-structure from the 3D-printed composite structure. Mechanical strength of 3D-printed support sub-structure can be measured by rheology method using the 3D-printed support sub-structure or bulk polymerized 3D-printing support material. Typical storage modulus value is between 100 Pa to 10 kPa.

Solubility and dissolution rate of the 3D-printed support sub-structure in warm water is measured by the time period used for the complete dissolution of the 3D-printed support sub-structure when it is immersed into water with or without ultrasonication at specified temperature, preferably about 90° C., more preferably about 50° C. Temperature of the warm water that the 3D-printed support sub-structure will be dissolved in is an important factor to be considered. It is apparent that a lower temperature is preferred.

The experiment can be carried out at pH of 6 to 8, preferably pH 7.

In order to simplify the measurement of the time, it is possible to use a piece of bulk polymerized 3D-printing support material rather than a 3D-printed support sub-structure. To do so, the 3D-printing support material composition of the present invention is prepared and polymerized in absence of any 3D-printing build material under the same condition to prepare the 3D-printed composite structure comprising the 3D-printed build sub-structure and the 3D-printed support sub-structure. The obtained bulk polymerized 3D-printing support material is put into warm water under the same condition to remove the 3D-printed support sub-structure from the 3D-printed composite structure, and the time before complete dissolution of the bulk polymerized 3D-printing support material is measured. Those skilled in the art will appreciate that although the time period used to completely dissolve the bulk polymerized 3D-printing support material can be different from the time period to completely dissolve the 3D-printed support sub-structure, the above two time periods are closely related proportionally.

The present inventors have found that, with the inventive composition, the balance of i) the copolymerization rate of the 3D-printing support material composition, ii) the mechanical strength of the 3D-printed support sub-structure and iii) the solubility and dissolution rate of the 3D-printed support sub-structure can be achieved simultaneously.

The present inventors have surprisingly found that the present invention can be implemented successfully with lower warm water temperature, such as about 50° C., when the contents of each component of the 3D-printing support material composition of the present invention are within a certain range, and the ratio of the content of components (b) to (a), namely [b]/[a], higher than 0.05 and lower than 0.45, preferably lower than 0.4 by weight, more preferably lower than 0.25 by weight.

It is also possible to adjust the copolymerization rate of the 3D-printing support material composition by the intensity of UV light from the UV lamp, with higher intensity leading to faster copolymerization.

Another important property of the 3D-printing support material composition of the present invention is its viscosity, which is dominated by the requirement of the printer head set by its manufacturer. Viscosity of the 3D-printing support material composition can be determined using a MCR302/Anton Paar with measuring cone CP50-1 at 1000/s shear rate at various temperatures. Typical viscosity of the composition is <20 mPa·s at 70° C.

Those skilled in the art will appreciate that the inventive 3D-printing support material composition can comprise an optional component (e) of a functional additive or combination thereof. The optional component can be any known chemical substance serving its designated purpose under the provision that the desired performance of the inventive composition is not reduced significantly.

The optional component (e) may be stabilizing agent, preferably an antioxidant, such as butylated hydroxytoluene (BHT). The content of the stabilizing agent in the composition can be 0.1 to 5 weight percent, preferably 0.5 to 4 weight percent, and more preferably 1 to 3 weight percent. The stabilizing agent may also be a polymerization inhibitor to avoid undesirable polymerization during storage of the composition. Examples of the polymerization inhibitors include phenol compounds such as hydroquinone, hydroquinone monomethyl ether, 2,6-di-tert-butyl-p-cresol, 2,2-methylene-bis-(4-methyl-6-tert-butylphenol), and 1,1,3-tris-(2-methyl-4-hydroxy-5-tert-butylphenyl) butane, sulfur compounds such as dilauryl thiodipropionate, phosphorus compounds such as triphenyl phosphite, and amine compounds such as phenothiazine. The amount of the polymerization inhibitor can be less than 5%, preferably 0.1 to 3% in the composition.

The optional component (e) may be rheology modifier to ensure that the viscosity of the composition meets the requirement of 3D-printer head set by its manufacturer. The rheology modifier may comprise an ethoxylated fatty alcohol such as $CH_3-(CH_2)_{17}-(O-CH_2-CH_2)_{20}-OH$.

The optional component (e) may be filler which helps in maintaining geometry of the gel during polymerization and curing and cooling of the gel, such as reducing the thermal expansion, in increasing strength, in reducing thermal stability, in reducing cost and/or ensuring proper rheology. The filler may be an inorganic particle such as calcium carbonate, silica and clay. Nano-particles are especially useful fillers in ink-jet printing applications as a higher concentration can be used without significantly increasing viscosity of the ink. Inks comprising nano-particle fillers are also preferred as they are usually transparent.

The optional component (e) may be pigment exemplified by an organically-treated titanium dioxide, an organic pigment, an inorganic pigment, and a metallic pigment. In one embodiment of the invention, the pigment is a white pigment. The pigment concentration may be lower than 35%, preferably lower than 15%. In one embodiment of the present invention, the optional component (e) may further include a dye which imparts color to the composition and to the 3D-printed support sub-structure. Those skilled in the art will appreciate that it is possible to use a dye in the inventive composition.

The optional component (e) may be dispersant such as Disperbyk 110 which is a copolymer with acidic groups, and Disperbyk 163 which is a high molecular weight block copolymer with pigment affinic groups, both marketed by Byk Chemie, Wesel, Germany.

The optional component (e) may be surfactant to reduce the surface tension of the formulation to the value required for jetting or for printing process, which is typically around 30 dyne/cm. An example may be Byk 307, a silicone surface additive marketed by Byk Chemie, Wesel, Germany.

The optional component (e) may be chain transfer agent to regulate molecular weight of the polymer formed after polymerization. Examples of the chain transfer agent include hydrocarbons, halogenated hydrocarbons, thiols, ketones, aldehydes, phenols, quinones, amines and disulfides. The amount of the chain transfer agent used depends on the ratio of the content of components (e) and (d) and desired molecular weight of the polymer, and is less than 10%, preferably 0.05 to 5% in the composition.

Those skilled in the art will appreciate that the optional components (e) can be a combination of functional additives, as long as there is no significant negative interaction between each of the components (e) and between each of the components (a) to (e). Those skilled in the art will also appreciate that the content of the components (e) can be determined from the teaching of prior art or via routine experimentation.

Those skilled in the art will also appreciate that all the components of the composition should be selected in such a way that there is no apparent, known negative effect on the implementation of the present invention. For example, all the components in the composition should be selected so that covalent bond based crosslinking is substantially absent, preferably completely absent in the polymer network formed. Such selection is well within the capability of those skilled in the art from the teaching of prior art or via limited experimentation.

Particularly, the components are selected in such a way that the number of molecules capable of forming covalent bond based crosslinking in the polymerization is less than 10%, preferably 5%, more preferably 0% of the total number of molecules involved in the polymerization.

More particularly, the optional component (b) is selected in such a way that there is only one co-polymerizable double bond, preferably C=C double bond in each molecule, so that covalent bond based crosslinking is substantially absent, preferably completely absent, in the polymer network formed upon copolymerization of (a) and (b). In such case, the polymer network formed is soluble in warm water at a specified temperature, such as 30 to 90° C., preferably 40 to 60° C., more preferably about 50° C., with or without ultrasonication, stirring, jetting and/or washing. For example, while ACMO and 4-HBA are preferred candidates for component (b), poly(ethylene glycol) diacrylate, Mn-250 (PEGDA) cannot be used as component (b) due to the existence of two acrylic double bond, which lead to insoluble polymer network formed by 3D-printing supporting material.

The photopolymer jetting 3D-printed support sub-structure is produced by jetting drops of said liquid 3D-printing support material composition onto a build platform through one or more inkjet 3D-printer heads, followed by immediate UV light irradiation. The 3D-printing support material composition is preferably used as ink for the printer head directly. This process is repeated layer-by-layer to form a 3D-printed support sub-structure. The build material composition is jetted onto the build platform simultaneously, forming a 3D-printed build sub-structure, which forms a 3D-printed composite structure with the 3D-printed support sub-structure supports the 3D-printed build sub-structure.

The device used is well known to those skilled in the art, and can be exemplified by Eden 250, Eden 260V, Eden 500V, CONNEX 500 available from Stratasys, Eden Prairie, Minn., USA, or MJP 2500 Series available from 3D systems, Rock Hill, S.C., USA, or Agilista 3100 from Keyence, Osaka, Japan.

The UV lump used to generate UV light used for initiation is known to those skilled in the art, and can be exemplified by FE300 UV LED lamp emitting UV light at 365, 385, 395, 405 nm nm of wavelength, available from Phoseon Technology Co., Hillsboro, Oreg., USA.

The build material composition that is jetted onto the build platform together with the 3D-printing support material composition (but in different drops) is well known to those skilled in the art. For example, the composition can be exemplified by RGD720, RGD525 etc. available from Stratasys, Eden Prairie, Minn., USA.

After the completion of the printing of the build material through the inkjet print heads, and subsequent UV light irradiation, the 3D-printed support sub-structure can be removed using warm water. Particularly, the removal of the support material can be carried out by immersing the completed 3D-printed composite structure into warm water at a specified temperature, such as 30 to 90° C., preferably 40 to 60° C., more preferably about 50° C., with or without ultrasonication, stirring, jetting and/or scrubbing.

The invention has the following advantages over the known state of the art: 1) The 3D-printing support material is fast UV-curable to form a 3D-shape model; 2) The 3D-printing support material has good mechanical property as a support material; 3) The 3D-printing support material can be completely water soluble by warm water up to 90° C., preferably 50° C. The produced article of the present invention has very smooth surface.

Those skilled in the art will appreciate that the descriptions and definitions of various features can be combined freely, as long as there is significant negative impact on the implementation of the present invention. For example, as to the content of components (a), (b) and (d), the range, preferred range and more preferred range of each of the component can be combined to form various embodiments with different ranges of contents.

EXAMPLES

The implementation of the present invention will be demonstrated by the examples below, although the scope of the present invention is by no means limited to these examples.

Example 1

NAGA used in the examples is the compounds with the structure of $CH_2=CH-(C=O)-NH-CH_2-(C=O)-NH_2$, and the NAGA-NCH$_3$ used in the examples is the compounds with the structure of $CH_2=CH-(C=O)-NH-CH_2-(C=O)-NHCH_3$.

NAGA and NAGA-NCH$_3$ are synthesized in-house using the procedure described in Support Information of Dai, X. et al. Adv. Mater. 27, 3566-3671 (2015). 4-HBA, EG, TPO, ACMO, and PG are obtained from Sigma Aldrich, St. Louis, Mo., USA, under the trade name of 4-hydroxybutyl acrylate, ethylene glycol, diphenyl(2,4,6-trimethylbenzoyl)phosphine oxide, acryloyl morpholine, and propylene glycol, and are used as received.

The composition as listed in Table 1 was produced by mixing the components (e), (b), (c) and (d) in a 250 ml beaker and was stirred at room temperature with shielding of UV light from a FE300 UV LED lamp emitting UV light at 365 nm of wavelength, and then cured by exposing the mixture to UV light from said UV LED lamp for 10 seconds.

TABLE 1

| Example | Component (a) | | Component (b) | | Component (c) | | Component (d) | |
|---|---|---|---|---|---|---|---|---|
| E1 | NAGA | 20 g | 4-HBA | 5 g | EG | 75 g | TPO | 1 g |
| E2 | NAGA | 20 g | ACMO | 5 g | EG | 75 g | TPO | 1 g |
| E3 | NAGA | 20 g | | | EG | 80 g | TPO | 1 g |
| CE1 | acryl amide | 20 g | | | EG | 80 g | TPO | 1 g |
| CE2 | acryl amide | 20 g | ACMO | 5 g | EG | 75 g | TPO | 1 g |

During the experiments, the compositions listed as UV-curable in Table 2 were convert into solid, gel-like materials. The produced materials were tested for warm water solubility by immersing in warm water at specified temperature under ultrasonication. The testing result is also shown in Table 2. Other composition listed as not UV-curable in Table 2 remains as liquid after the exposure to the UV light.

TABLE 2

| Example | UV-curability* | Soluble in warm water at 50° C. with ultrasonication | Soluble in warm water at 90° C. |
|---|---|---|---|
| E1 | Yes | Yes (soluble within 23 min) | — |
| E2 | Yes | Yes (soluble within 15 min) | — |

TABLE 2-continued

| Example | UV-curability* | Soluble in warm water at 50° C. with ultrasonication | Soluble in warm water at 90° C. |
|---|---|---|---|
| E3 | Yes | No (insoluble after 120 min) | Yes (soluble within 60 min) |
| CE1 | No | — | — |
| CE2 | No | — | — |

*UV-curability is determined as "Yes" if the liquid composition converts into a solid, gel-like material after UV-curing (the products are then tested for warm water solubility by immersing in warm water at specified temperature under ultrasonication), and as "No" if not.

Table 2 clearly shows that successful formation of gel and dissolution of gel in warm water at 50° C. or 90° C. can be achieved with the combination of NAGA type monomer as monomer (a) and a mono-functional hydrophilic co-monomer as the optional monomer (b). However, warm water at 90° C. is required to dissolve the gel when the co-monomer (b) is absent, while only warm water at 50° C. is required when the co-monomer (b) is present. Furthermore, without NAGA type monomer as monomer (a), there is no gel formed after polymerization.

Example 2

A series of experiments are conducted using the same procedure of Example 1 but different amount/type of components (a) to (d). The results are listed in Table 3.

TABLE 3

| | A | B | C | D | E | F | G | H | I |
|---|---|---|---|---|---|---|---|---|---|
| Component A | | | | | | | | | |
| NAGA (g) | 25 | 20 | 20 | 20 | 20 | 40 | | 20 | 20 |
| NAGA-NCH$_3$ (g) | | | | | | | 30 | | |
| Component B | | | | | | | | | |
| ACMO (g) | | 5 | | 10 | | | | | |
| 4-HBA (g) | | | 5 | | 10 | 10 | 7.5 | 5 | 8 |
| Component C | | | | | | | | | |
| EG (g) | 75 | 75 | 75 | 70 | 70 | 50 | 62.5 | | 72 |
| PG (g) | | | | | | | | 75 | |
| Component D | | | | | | | | | |
| TPO (g) | 1 | 1 | 1 | 1 | 1 | 1 | 1 | 1 | 1 |
| Gel properties | | | | | | | | | |
| UV-curability* | Yes | Yes | Yes | No | No | No | Yes | Yes | Yes |
| Mechanical property** | Good | Good | Good | — | — | — | Good | Good | Good |
| Warm water solubility*** | No | Yes | Yes | — | — | — | Yes | Yes | Yes |
| [b]/[a] by weight | 0 | 0.25 | 0.25 | 0.5 | 0.5 | 0.25 | 0.25 | 0.25 | 0.4 |

*UV-curability is determined as "Yes" if the liquid composition converts into a solid, gel-like material after UV-curing, and as "No" if the liquid composition remains to be liquid state.
**Mechanical property is determined as "Good" if the solid, gel-like material formed after UV-curing has storage modulus (G') higher than 100 Pa at 30° C., and as "Poor" if not.
***Warm water solubility is determined as "Yes" if the solid, gel-like material is dissolved in water within 30 minutes at 50° C. under ultrasonication, and as "No" if not.

It can be seen that satisfactory result has been achieved when the content of (a) is 20-25% by weight of the composition, the content of (b) is 5-10% by weight of the composition, and the ratio of the content of (b) and (e) [b]/[a] is between 0.25 to 0.4. It should be noticed that only satisfying the requirement on the contents of (a) to (d) is not sufficient. For example, using 20 g of NAGA, 10 g of ACMO and 1 g of TPO doesn't lead to formation of gel. On the other hand, in a similar experiment, with 20 g of NAGA, 5 g of 4-HBA and 1 g of TPO, the present invention can be carried out successfully.

Table 3 also shows that it is possible to use NAGA type monomer other than NAGA itself to implement the present invention.

The present invention therefore comprises the following embodiments.

1. A composition which can form a 3D-printed support sub-structure supporting a 3D-printed build sub-structure during jetting 3D-printing, said 3D-printed support sub-structure is crosslinked via hydrogen bonding formed by repeating units derived from a monomer in the composition, said hydrogen bonding is broken when contacting with warm water after the completion of jetting 3D-printing so that the 3D-printed support sub-structure can be removed, leaving the 3D-printed build sub-structure as final product.

2. A UV-curable composition, comprising
   (a) at least one monomer which produces the hydrogen bond forming repeating units upon polymerization;
   (b) optionally at least one hydrophilic co-monomer having one co-polymerizable double bond, preferably C=C double bond in each molecule;
   (c) at least one hydrophilic dispersion medium or water;
   (d) at least one photoinitiator; and
   (e) optionally at least one component of a functional additive or combination thereof;
   wherein the contents of (a), (b) and (d) are, based on the total weight of the composition, (a): 5%~34% by weight; (b): 1.5%~15% by weight, if present in the composition; and (d): 0.1%~10% by weight; respectively.

3. The composition of item 2, wherein component (a) is at least one N-acryloyl glycinamide type monomer of the formula

where X is —$(CH_2)_{x1}$—, x1 is an integer of 1 to 10, or X is —$(CH_2CH_2O)_{x2}$—, x2 is an integer of 1 to 5; $R_1$ is H or $CH_3$;
$R_2$ and $R_3$ is each independently H or —$C_mH_{2m+1}$, m is an integer of 1 to 4;

4. The composition of item 2 or 3, wherein (b) is present in the composition and the ratio of the content of (b) and (a) is 0.05 to 0.45 by weight, preferably 0.05 to 0.4 by weight; more preferably 0.2 to 0.4 by weight.

5. The composition any one of item 2 to 4, wherein X is —$(CH_2)_{x1}$— wherein x1 is 1 to 6, more preferably 1 to 4, or X is —$(CH_2CH_2O)_{x2}$—, wherein x2 is 1 to 2.

6. The composition of any one of items 2 to 5, wherein $R_2$ and $R_3$ is independently selected from the group consisting of H, methyl group, ethyl group and propyl group; preferably at least one of $R_2$ and $R_3$ is H.

7. The composition of any one of items 2 to 4, wherein the N-acryloyl glycinamide type monomer (a) is of the formula

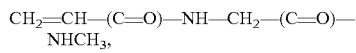

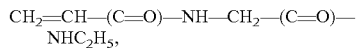

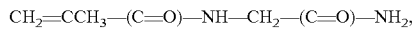

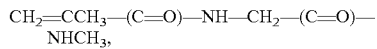

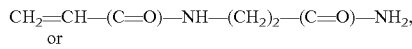

or

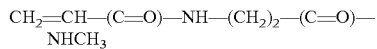

8. The composition of any one of items 2 to 7, wherein (b) is present in the composition and is water soluble, preferably is water-miscible.

9. The composition of any one of items 2 to 8, wherein (b) is present in the composition and is selected from the group consisting of acryloyl morpholine, 4-hydroxybutyl acrylate, (meth)acrylic acid, 2-Hydroxyethyl (meth)acrylate, hydroxypropyl (meth)acrylate, N,N-dimethylaminoethyl (meth)acrylate, N-vinylformamide, (meth)acrylamide, N-hydroxyethyl (meth)acrylamide, and sodium (meth)acrylate.

10. The composition of any one of items 2 to 9, wherein (c) is water soluble, preferably is water-miscible.

11. The composition of any one of items 2 to 10, wherein (c) does not having any co-polymerizable double bond.

12. The composition of any one of items 2 to 11, wherein (c) is selected from the group consisting of ethylene glycol, polyethylene glycol, propylene glycol, polypropylene glycol and glycerol.

13. The composition of any one of items 2 to 12, wherein (d) is selected from the group consisting of Darocur BP, Darocur 1173, Darocur 4265, Irgacure 184, Irgacure 250, Irgacure 369, Irgacure 379, Irgacure 651, Irgacure 754, Irgacure 819, Irgacure 2022, Irgacure 2100, Irgacure 2959, Irgacure TPO, and Irgacure TPO-L.

14. The composition of any one of items 2 to 13, wherein the content of (a) is 10%~30% by weight, preferably 15%~30% by weight.

15. The composition of any one of items 2 to 14, wherein (b) is present in the composition and the content of (b) is 5%~12% by weight.

16. The composition of any one of items 2 to 13, wherein the content of (a) is 15%~30% by weight, (b) is present in the composition and the content of (b) is 5%~12% by weight, the ratio of the content of (b) and (a) is 0.2 to 0.4 by weight.

17. The composition of any one of items 2 to 16, wherein the content of (d) is 0.5%~5% by weight.

18. The composition of any one of items 2 to 17, wherein the total contents of (a) to (e) is 100% by weight.

19. A photopolymer jetting 3D-printing process, wherein drops of liquid photopolymers as build material and the composition of any of items 1 to 18 as support material are jetted onto a build platform through inkjet print heads separately to form a layer of pattern and then cured by UV light in such a way that, with the printing process repeated layer by layer, the two materials form a composite structure with two sub-structures, to form a 3D-printed article of the build material supported by a 3D-printed support sub-structure, followed by removal of the 3D-printed support sub-structure using warm water.

20. The process of item 19 wherein warm water is neutral water at 30 to 90° C., preferably 40 to 60° C., more preferably about 50° C.

21. The process of item 19 or 20 wherein the removal of 3D-printed support sub-structure is performed under ultrasonication, stirring, jetting and/or washing.

22. A 3D-printed article formed in the process of any one of items 19 to 21.

Unless otherwise indicated, all numbers expressing quantities of components, reaction conditions, dimensions, physical characteristics, processing parameters, and the like, used in the specification are to be understood as being modified in all instances by the term "about". Accordingly, unless indicated to the contrary, the numerical values set forth in the specification may vary depending upon the desired properties sought to be obtained by the present invention.

The invention claimed is:
1. A UV-curable composition, comprising (a) at least one monomer which produces hydrogen bond forming repeating units upon polymerization;
(b) optionally at least one hydrophilic co-monomer having one co-polymerizable double bond in each molecule;
(c) at least one hydrophilic dispersion medium or water;
(d) at least one photoinitiator; and
(e) optionally at least one component of a functional additive or combination thereof;
wherein the contents of (a), (b) and (d) are, based on the total weight of the composition, (a): 5%~34% by weight; (b): 1.5%~15% by weight, if present in the composition; and
(d): 0.1%~10% by weight; respectively;
wherein component (a) is at least one N-acryloyl glycinamide type monomer of the formula

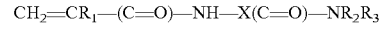

where X is —$(CH_2)_{x1}$—, x1 is an integer of 1 to 10, or X is —$(CH_2CH_2O)_{x2}$—, x2 is an integer of 1 to 5;

$R_1$ is H or $CH_3$;

$R_2$ and $R_3$ is each independently H or $-C_mH_{2m+1}$, m is an integer of 1 to 4.

2. The composition of claim 1, wherein (b) is present in the composition and the ratio of the content of (b) and (a) is 0.05 to 0.45 by weight.

3. The composition of claim 1, wherein X is $-(CH_2)_{x1}-$ wherein x1 is 1 to 6, or X is $-(CH_2CH_2O)_{x2}-$, wherein x2 is 1 to 2.

4. The composition of claim 1, wherein $R_2$ and $R_3$ is independently selected from the group consisting of H, methyl group, ethyl group and propyl group.

5. The composition of claim 1, wherein the at least one N-acryloyl glycinamide type monomer (a) is of the formula

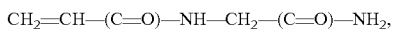

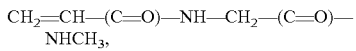

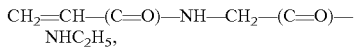

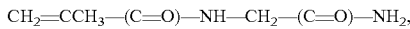

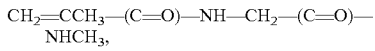

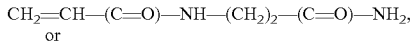

or

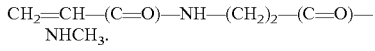

6. The composition of claim 1, wherein (b) is present in the composition and is water soluble.

7. The composition of claim 1, wherein (b) is present in the composition and is selected from the group consisting of acryloyl morpholine, 4-hydroxybutyl acrylate, (meth)acrylic acid, 2-Hydroxylethyl (meth)acrylate, hydroxypropyl (meth)acrylate, N,N-dimethylaminoethyl (meth)acrylate, N-vinylformamide, (meth)acrylamide, N-hydroxyethyl (meth)acrylamide, and sodium (meth)acrylate.

8. The composition of claim 1, wherein (c) is water soluble.

9. The composition of claim 1, wherein (c) does not having any co-polymerizable double bond.

10. The composition of claim 1, wherein (c) is selected from the group consisting of ethylene glycol, polyethylene glycol, propylene glycol, polypropylene glycol and glycerol.

11. The composition of claim 1, wherein the content of (a) is 10%~30% by weight.

12. The composition of claim 1, wherein (b) is present in the composition and the content of (b) is 5%~12% by weight.

13. The composition of claim 1, wherein the content of (a) is 15%~30% by weight, (b) is present in the composition and the content of (b) is 5%~12% by weight, the ratio of the content of (b) and (a) is 0.2 to 0.4 by weight.

14. The composition of claim 1, wherein the content of (d) is 0.5%~5% by weight.

15. The composition of claim 1, wherein the total contents of (a) to (e) is 100% by weight.

16. A photopolymer jetting 3D-printing process, wherein drops of liquid photopolymers as build material and the composition of claim 1 as support material are jetted onto a build platform through inkjet print heads separately to form a layer of pattern and then cured by UV light in such a way that, with the printing process repeated layer by layer, the two materials form a composite structure with two sub-structures, to form a 3D-printed article of the build material supported by a 3D-printed support sub-structure, followed by removal of the 3D-printed support sub-structure using warm water.

17. The process of claim 16 wherein warm water is neutral water at 30 to 90° C.

18. The process of claim 16 wherein the removal of 3D-printed support sub-structure is performed under ultra-sonication, stirring, jetting and/or washing.

19. A 3D-printed article formed in the process of claim 16.

20. The composition of claim 1, wherein (b) is present in the composition and is water-miscible.

* * * * *